United States Patent [19]
Rod

[11] 3,797,667
[45] Mar. 19, 1974

[54] WHIRLPOOL SEPARATOR DEVICE

[75] Inventor: Robert L. Rod, Pacific Palisades, Calif.

[73] Assignee: Monogram Industries, Inc., Santa Monica, Calif.

[22] Filed: Feb. 10, 1972

[21] Appl. No.: 225,268

[52] U.S. Cl............... 210/304, 210/313, 210/315, 210/512
[51] Int. Cl............................................ B01d 21/26
[58] Field of Search ............ 209/211; 210/512, 304, 210/311, 313, 315, 316, 318

[56] References Cited
UNITED STATES PATENTS

| | | | |
|---|---|---|---|
| 3,698,555 | 10/1972 | Conner............................. | 210/304 X |
| 3,698,558 | 10/1972 | Weber et al..................... | 210/304 X |
| 3,130,157 | 4/1964 | Kelsall et al.................... | 209/211 X |
| 3,507,397 | 4/1970 | Robinson.......................... | 210/512 |
| 2,983,384 | 5/1961 | Winslow.......................... | 210/304 X |

*Primary Examiner*—Samih N. Zaharna
*Assistant Examiner*—F. F. Calvetti
*Attorney, Agent, or Firm*—Miketta, Glenny, Poms & Smith

[57] ABSTRACT

A whirlpool separator is described in which a charge of fluid is circulated at approximately 20 to 30 revolutions per minute in a container. Foreign matter having a specific gravity greater than one is thrown by centrifugal force to the periphery of the container. These heavier particles fall to the lowermost portion of the container for eventual discharge. Foreign oily material having a specific gravity less than one is forced to the top of the fluid and into the vortex created by the circulating fluid where it is removed by hydrophobic material located near the vortex. Small fines are removed by filtration.

4 Claims, 4 Drawing Figures

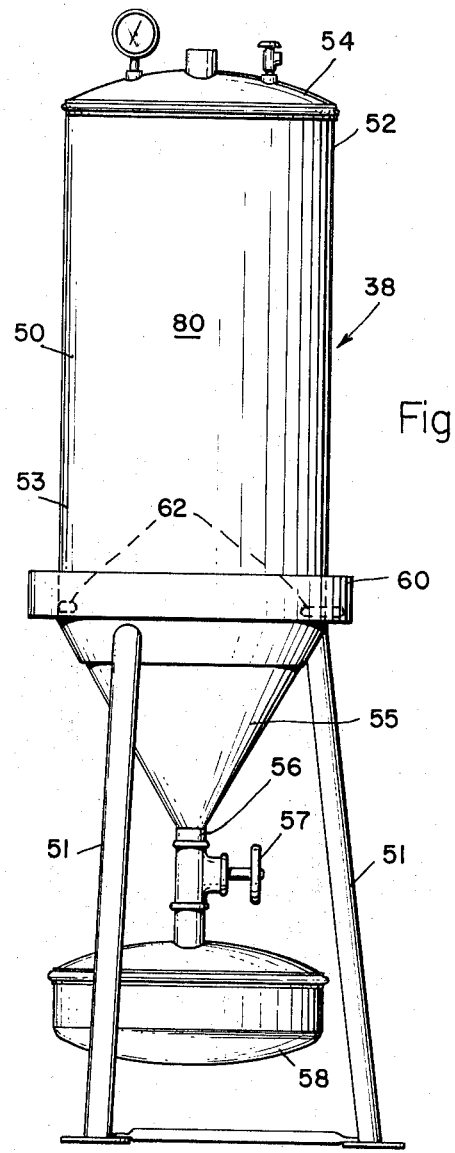
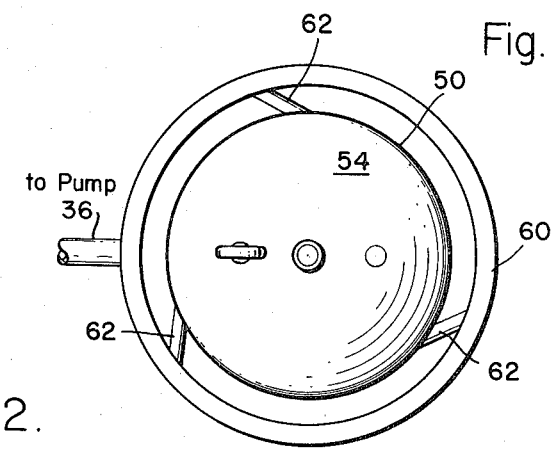
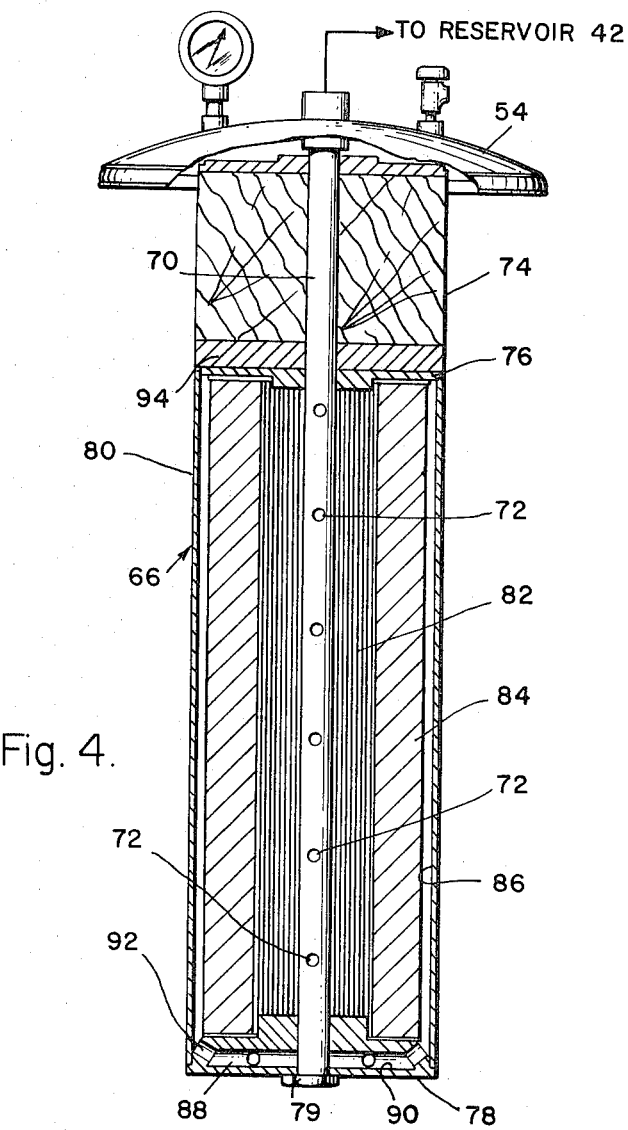
Fig. 2.
Fig. 3.
Fig. 4.

WHIRLPOOL SEPARATOR DEVICE

This invention relates generally to a fluid separator and more particularly to a whirlpool separator for removing foreign materials having a wide range of specific gravities from a fluid.

Generally, foreign suspended materials may be removed from a fluid by a filtering process, which discriminates based upon size. An analysis will show that foreign materials located in a fluid usually consist of materials having a specific gravity greater than the fluid and materials having a specific gravity that is less than the fluid. Those materials having a higher specific gravity approach a solid condition and if the particles sizes are large enough, they tend to settle out. Those foreign materials having a specific gravity that is less than the fluid are usually lighter than fluid and tend to float on the surface of the fluid being cleaned.

In the art of purifying water, most foreign material can be first removed by either a separation process or a plurality of separation processes, depending upon the size and kinds of foreign material. The efficiency of the separating process insofar as suspended solids are concerned is determined as a function of the particles, measured in terms of their specific gravity, that remain in the fluid after the separating process.

The ultimate use of the fluid will determine the degree of purity and clarity required since it is well known that irrigation water and drinking water have different purity requirements, and hence require different degrees of separation and filtering.

The present invention is concerned with a combined separator and filtering system for use with a "grey water" recirculating system.

In the absence of a community sewer system, dwellings have included private sewage disposal facilities such as cesspools and septic tanks, which accumulate wastes and permit the fluid components thereof to discharge into the earth through a drainage field while the solid components are held and decomposed by natural means. Other sewage disposal facilities are no more sophisticated than a direct pipe into a nearby body of water with no attempt made at the treatment of the sewage.

A major consideration in dealing with preservation of natural resources, is the exploitation of the water resources in connection with human habitation. Vast quantities of water are consumed in a typical household, only a fraction of which is utilized for drinking or cooking.

Most of the water utilized is employed for laundry purposes, washing, baths or showers and in the disposal of human waste. Great quantities of water are also utilized for other domestic tasks such as watering lawns or gardens, washing cars and the like.

In dealing with the problem of water waste management, two categories have been established. A first, known as "grey water" includes the major portion of water utilized in human activities. The grey water includes all of the water currently being discharged into sewer systems, excepting only the toilet waste products. The output of the toilet is considered "black water" and include the human wastes which must be ultimately disposed. The "black water" output includes large quantities of water, which have been required in toilets to dispose of a relatively small quantities of human waste. In most sewage systems, the grey water and black water effluents are indiscriminately mixed and are ultimately applied to the same waste treatment facility. Since water is rapidly becoming a resource in short supply, it has been suggested that at least the grey water component of the waste output be reclaimed for all purposes save drinking or cooking.

In order to provide a substantially sewerless community or a sewerless house, it has been discovered that a combination of a grey water recovery system and a novel black water waste incinerator can be efficiently utilized. However, because of the quantities of energy required to incinerate the water components of any black water system, it has been determined that some means should be provided to concentrate the human wastes.

One such system has been described and claimed in a copending patent application entitled "Sewerless Disposal System" by George C. Roberts and assigned to the same common assignee as the present invention. Recirculating toilet systems are suggested to limit the amount of water required in the disposal of human wastes, concentrating the waste components of black water waste systems have been described in the patents to J. W. Dietz, et al., U.S. Pat. No. 3,067,433; R. F. Corliss, U.S. Pat. No. 3,079,612; N. J. Palmer, U.S. Pat. No. 3,473,171 and U.S. Pat. No. 3,537,590. Such recirculating toilet systems reduce the demand for water in their operation and effectively concentrate the waste products for more convenient disposal.

In recent years, such recirculating toilet systems have achieved great success and popularity in vehicles such as boats, aircraft, campers and trailers. These recirculating toilet systems operate on a basic charge of 3 gallons of liquid and permit approximately 80 to 90 utilizations on a single charge. If one or more of these recirculating toilet systems were employed in a household, the units would require emptying and refilling approximately twice per month.

According to the present invention, there is disclosed a water purifier for use with a sewerless house or sewerless community in which "grey" waste water is separately collected and applied to the water purifier where foreign materials are removed and the clear effluent can be accumulated for further uses.

In the preferred embodiment, the separator consists of a cylindrical holding tank having an upper portion and a lower portion located along a central vertical axis. The lower portion of the tank has a frusto conical section for holding a charge of fluid and which terminates in a waste collection orifice in the bottommost portion. The fluid in the tank is forced to rotate at a rotational velocity of approximately 20 to 30 revolutions per minute. This rotational velocity of the fluid creates a vortex at the centermost portion and an increase in the outer level of the fluid.

The rotation of the liquid forces foreign materials having a specific gravity greater than water or one to be centrifugally forced to the periphery of the holding tank. The separated heavier material will eventually settle from the lower portion to the conical section and thence to the waste collection orifice located at the bottommost portion.

That foreign material having a specific gravity less than one is forced up into the vortex and into the upper portion of the separator due to the rotating fluid. A hydrophobic material located in the upper portion of the tank and along the axial center will absorb and adsorb oily foreign material having a low specific gravity that is located in the vortex of the rotating liquid. The clear effluent is removed from the tank by means of a centrally located pipe that extends into the lower portion.

Associated with the separator is a dual 5 and 0.5 micron filter that removes foreign material having a specific gravity above one. The filter assembly comprises a centrally located output pipe having a plurality of openings located on the periphery of said pipe. A two-stage filter is located radially on the pipe and covers the plurality of openings.

A radially oversized solid outer housing completely covers the filters on the periphery and on the upper and lower edge portions. Due to the housing being oversized, there is an annular groove between the periphery of the filter and the internal diameter of the housing. A plurality of openings is located on the lowermost edge portion of that housing that communicates with the annular groove in said housing thereby providing a suitable passageway for fluid from the lowermost housing, through the internal periphery of said housing to thereby communicate with the filters for eventual discharge through the output pipe.

The separator is sealed and the charge of fluid is limited to the lowermost portion of the tank. The centrally located filter is not normally immersed in the liquid but rather is located above the defined level of the fluid, with only the openings in the lower edge portion located in the fluid.

Rotation of the fluid is achieved in the preferred embodiment by inserting fluid under pressure into the lowermost portion of the tank at an angle relative to the cylindrical holding tank thereby imparting a rotational velocity to the fluid located in the lower housing. Insertion of the fluid will increase the fluid pressure while rotation of the fluid will cause the outer level of the vortex to rise. The overall effect is that foreign oily materials with low specific gravity are forced to the uppermost portion of the cylinder to be removed by the hydrophobic material. The large foreign suspended materials having a specific gravity greater than one are thrown to the sides of the lower housing by the centrifugal force of the rotation fluid for eventual discharge into the discharge orifice located at the bottom of the conical housing. Smaller remaining foreign suspended materials are removed by the dual 5, 0.5 micron filters.

The clarified fluid is drawn from the holes located in the lowermost edge portion of the filter assembly in the liquid level. The fluid will be forced into the holes and into the annular groove, through the filters and into the holes on the output pipe for discharge through the centrally located pipe.

In the preferred embodiment a cylinder of dry chlorine source for disinfecting the effluent may be located either inside the output pipe or on that periphery of the output pipe near the hydrophobic material. The size of the chlorine cylinder will be a function of the capacity of the unit. The chlorine in either is located so that it will only be wetted when the unit is in operation, hence making it a true demand system.

The features which are believed to be characteristic of the invention will be better understood from the following description considered in connection with the accompanying drawings. Further objects and advantages of the invention will be made more apparent by now referring to the accompanying drawings wherein:

FIG. 2 illustrates a freestanding separator constructed according to the teachings of the present invention;

FIG. 3 is a plan view of the separator of FIG. 2 illustrating a preferred manifold for creating the whirlpool effect; and FIG. 4 illustrates a two-stage filter for use with the separator of FIG. 2.

Figure 1:
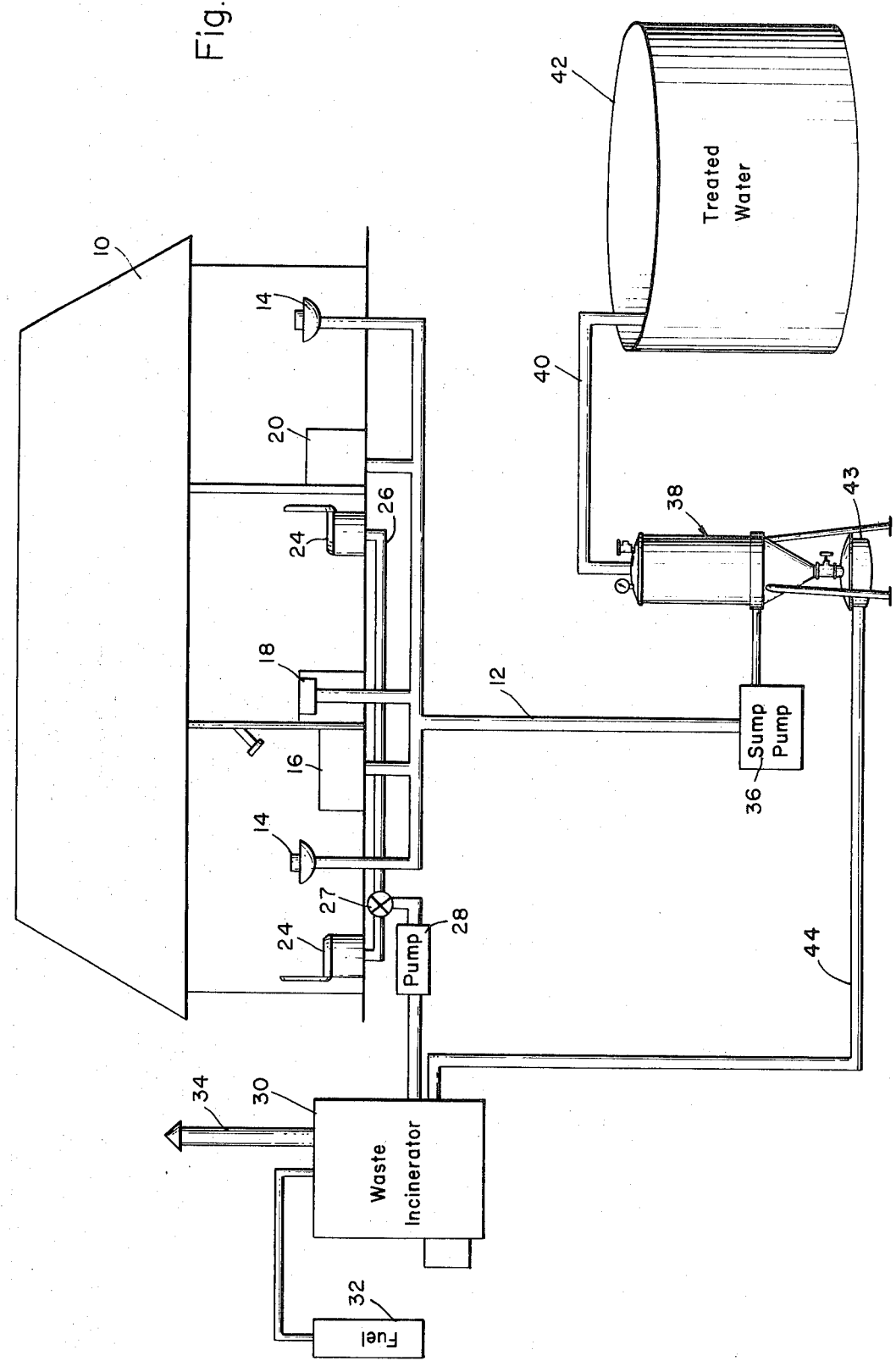
FIG. 1 is a block diagram of a waste management system illustrating the present invention in a grey water system.

Referring now to FIG. 1, there is shown, in an extremely idealized fashion, an embodiment of a sewerless waste management system adapted for use with a single family dwelling 10 having a plurality of recirculating toilet systems. It will be recognized, of course, that the system illustrated in connection with FIG. 1 could be connected to any form of shelter having a waste disposal problem. It is assumed, however, that the structure has access to running water.

As seen in FIG. 1, a common waste line 12 is connected to receive grey water effluent from a plurality of lavatory sinks 14, a bathtub 16 which may include a shower, a kitchen sink 18 and a washing machine 20. For the purposes of the present invention, the black water discharge from the toilets are not connected to the common waste line 12.

The black water system is comprised of a plurality of recirculating toilet systems 24. Any of the recirculating toilet systems sold by Monogram Industries, Inc. under the trademark Monomatic and as shown in the patents either to Palmer, Carlson or the other mentioned earlier could be utilized. Each of the recirculating toilet systems 24 is adapted to be connected to a black-water waste drain 26.

When using more than one toilet system 24, the waste drains 26 are connected to a multi-positional valve 27 which selectively discharges the output of each toilet system into a macerator grinder pump 28. The valve 27 may be manually or automatically controlled, depending on external considerations. A macerator grinder pump 28 such as is currently available from Monogram Industries under the trademark Monopump, is connected to receive the individual contents of the recirculating toilet system 24 at such times as the system is drained by the action of the valve 27.

The output of the macerator grinder pump 28 is applied to a waste incineration system 30 of the type described and shown in U.S. Pat. No. 3,380,673 or in the copending application of George C. Roberts and Donald A. Dotson, Ser. No. 202,234, filed Nov. 26, 1971. The macerator grinder pump converts the stored waste products and liquid into a finely divided slurry which is capable of being pumped to an appropriate disposal or receptacle. The waste incinerator system 30 is connected to a source of fuel 32 and includes an exhaust stack 34 which returns the $CO_2$ and water vapor generated through the incineration of wastes, to the atmosphere.

The main waste line 12 preferably includes a sump pump 36 connected to a grey water purification system 38 which provides a first output of treated water of tertiary quality through a water line 40. The treated water can be stored in a reservoir 42 for subsequent utilization for purposes such as irrigation, watering animals, or the like. Such water may also be returned to ponds, lakes or streams or otherwise disposed of without polluting the environment.

A second output from the water purification system 38 is from a waste collection and storage area 43 which is preferably fed through a line 44 to the waste incinerator 30. Solid, non-burnable waste may be removed directly at the container 43 associated with the water purification system 38. Burnable waste, however, may require a macerator grinder pump similar to pump 28.

In operation, the accumulated contents of the recirculating toilet systems 24 are periodically drained by valve 27 and with the aid of the macerator pump 28, the sludge is pumped into the incinerator 30 which is thus charged for operation. The incinerator, when operated, completely incinerates the comminuted slurry output of the macerator grinder 28, converting the liquid slurry to water vapor, $CO_2$ and ash, without odor or smoke. The remaining water utilization elements of the dwelling 10, including the bath 16, lavatory sink 14, the kitchen sink 18 and the washing machine 20, as they are used, will apply their grey water waste to the waste line 12 and the sump pump 36, which may or may not have an accumulating tank, depending upon the needs and use of the system.

Referring now to FIG. 2, there is shown a preferred embodiment of the water purification system 38, comprising a free-standing cylindrical tank 50 supported by a plurality of legs 51. The cylindrical tank 50 is composed of an upper portion 52 and a lower portion 53. A removable cover 54 is sealed to the upper portion 52.

The lower portion 53 of the tank 50 is connected to a frusto conical section 55 that terminates in a discharge orifice 56. The discharge orifice 56 is controlled by means of a valve 57 which controls the discharge of the solid waste material into a container 58. The container 58 is similar to the container 43 illustrated in FIG. 1, and may have a separate line connected directly to the waste incinerator or simply accumulate the solid waste for disposal at a later time.

The input to the tank 50 is achieved through a manifold 60 communicating with the interior of the tank by means of a plurality of inlet ports 62. In the preferred embodiment the manifold 60 is located around the outside periphery of the lower portion 53 of the tank 50 and has 3 ports communicating with the interior of the tank 50. The three ports are located at an angle relative to the tank 50 and are arranged to introduce the intake fluid from the sump pump 36 (shown in FIG. 1) into the interior of the tank 50 so as to increase the internal pressure of the tank and also cause the fluid located within the tank to have an initial velocity of approximately 20 to 30 revolutions per minute.

Referring now to FIG. 3, there is illustrated the manifold 60 having three ports 62 communicating with the interior of the tank 50. The sump pump 36 communicates the grey fluid from the house dwelling 10 to the manifold 60 for distribution to the three intake ports 62.

Referring now to FIG. 4, there is shown a filter assembly 66 attached to the cover 54 by an output pipe 70. The output pipe 70 is centrally located and is attached at one end to the cover 54 and, the other end, to the filter assembly 66 and is the main structural element for supporting the filter elements to be described. The pipe 70 is located on the axial center of the tank 50 and contains a plurality of holes 72 located on the periphery of the pipe.

Located on the upper portion of the pipe 70 and abutting against the inside surface of the cover 54 is a hydrophobic material 74 shaped as a cylinder and generally constructed from pressed newspaper or cellulose material. The hydrophobic material 74 functions as an oil absorber or adsorber to thereby remove foreign oily material in the fluid having a specific gravity that is less than one, such as cooking oils and the like.

The hydrophobic material 74 is supported and rests on a substantially solid upper baffle plate 76. The pipe 70 passes through a centrally located hole in the upper baffle plate 76 and is fixedly attached at the lowermost portion to a lower baffle plate 78 by a locknut 79. A solid outer housing 80 is connected to the peripheral portions of the upper baffle plate 76 and the lower baffle plate 78 to thereby completely enclose and protect the interior portion from contact with the external fluids.

Located within the solid outer housing 80 and between the upper baffle 76 and the lower baffle 78 are a pair of cylindrically shaped two-phase filters 82 and 84. The inner filter 82 is a "fine" filter for removing foreign material having a particle size greater than approximately ½ micron. The outer or "coarse" filter 84 will filter all other foreign material having a particle size greater than approximately 5 microns.

The filters 82 and 84 are commercially available and are generally constructed of pleated paper. The external diameter of the coarse filter 84 is chosen to be less than the internal diameter of the solid outer housing 80 to thereby define an annular passageway 86, extending lengthwise from the lower baffle plate 78 to the upper baffle plate 76.

The lower baffle plate 78 is substantially solid, except for a plurality of holes 88 located on the periphery thereof which communicates with a central opening 90 also located within the lower baffle plate 78. A substantially radial passageway 92 in the lower baffle plate 78 connects the central opening 90 with the annular passage 86 to thereby allow fluid enter the holes 88 to flow into the opening 90 and thence through the radial passageway 92 into the annular passageway 86.

Fluid located within the annular passageway 86 will traverse the coarse filter 84 and the fine filter 82 in a radial direction and enter the holes 72 located on the pipe 70 for eventual discharge through the pipe 70 to the external holding reservoir 42 ilustrated in FIG. 1.

In operation, fluid from the sump pump 36 is fed into the conical portion 55 of the water purification system 38 to a point approximately where the frusto-conical portion meets the lower portion 53 of the tank 50. Fluid from the grey water system will be under pressure caused by the sump pump 36. The grey water fluid fed into the manifold 60 under pressure of the pump 36 will impart a whirlpool action to the initial charge of fluid located within the tank 50.

As a result of the whirlpool action, settleable foreign material having a specific gravity greater than that of the fluid and located within the charge of fluid will be thrown by centrifugal force to the periphery of the lower portion 53 of the tank 50. These heavier solids will fall as a result of gravity along the conical surfaces 55 and will collect against the lowermost discharge orifice 56.

The combination of the manifold ring 60 and the pump 36 will inject a stream of water under pressure into the tank 50 that is sufficient to rotate the charge of fluid at approximately 20 revolutions per minute. Investigation has shown that the substantially low rotational velocity of 20 revolutions per minute will remove approximately 50 percent of the settleable solids from the fluid in the tank 50.

The tank cover 54 is hermetically sealed to the tank 50 and the pipe 70 is open to the atmosphere. However, the path is a high impedance one and, as a result, the water entering the ports 62 under pressure results in a pressure build up within the tank 50. Experimentation has shown that a pressure sufficient to cause 20 to 30 revolutions per minute of the fluid located in the bottommost portion of the tank 50 generates a vortex which has a higher level at the periphery of the tank than at the center of the center.

The rotating fluid will contain the foreign material having a specific gravity that is less than that of the fluid at the vortex. This foreign material generally consists of oils, such as cooking oils, fats and other low specific gravity material. The rotating fluid will force the low specific gravity material in concentrated amounts to the center of the vortex and against the hydrophobic material 74 which is located at the uppermost portion of the tank 50.

Other solid contaminants either having a neutral buoyancy will generally remain suspended and may or may not be transported through the filters of the system. In any event, this foreign material may be deemed benign and need not be of concern.

In review, therefore, we can see that, in operation, the low specific gravity material collects at the vortex and is brought into contact with the hydrophobic material 74 as the level of the rotating fluid rises in the tank 50. The higher specific gravity material is thrown by centrifugal force to the periphery of the lower portion 53 of the tank 50, where it eventually settles through the conical section 55 to the discharge orifice 56.

The cleanest portion of the rotating fluid is, therefore, at the lowermost portion at the center where the openings 88 in the filter assembly 66 are located. The substantially clear fluid is then forced into the openings 88, the pressure differential being built up between the tank 50 interior and atmosphere. This fluid will then flow through the passage 90 and into the radial passage 92 and into the annular passage 86 for eventual filtering by the coarse filter 84 and the fine filter 82. The substantially filtered fluid will then enter the holes 72 located in the pipe 70 for discharge into the treated water reservoir 42 illustrated in FIG. 1.

In an effort to control bacteria growth, a cylinder 94 of a dry chlorine producing compound may be located between the hydrophobic material 74 and the upper baffle plate 76 as shown in FIG. 4. The actual shape of the chlorine compound and its placement is not critical and is dictated by external requirements of the system. The use of the chlorine prevents algae and other micro organisms from growing in the water medium. The chlorine compound cylinder 94 is generally kept out of the water in order to prevent rapid consumption of the chlorine. However, whenever the system is operated, the water level rises to immerse the cylinder 94 which liberates adequate amounts of active chlorine compounds.

The size of the filters 82 and 84 and the hydrophobic element 74 and the chlorine compound cylinder 94 are designed and sized for the given application and system so that the user must periodically remove and replace the complete assembly illustrated in FIG. 4.

The separator and filter system illustrated in FIGS. 2, 3 and 4 will provide a tertiary quality, treated water that should substantially reduce the demand for fresh water in any given dwelling. The water then produced without further treatment may be used and recirculated for washing and irrigation purposes. If care is given to the foreign substances introduced into the "grey water" during its utilization in the dwelling, and the user has not introduced any solutes which are potentially harmful to life, the recovered water may even be used for livestock and, if necessary, for drinking and cooking purposes.

In a completely automatic system, it is envisioned that a liquid level sensor in the form of an overflow pipe may be used to control the initial level of the charge of water filling the cylindrical tank 50. The overflow will simply be fed back to the sump pump 36 illustrated in FIG. 1. During continuous operation, a suitable solenoid valve may be used to interrupt the overflow during the application of pressure from the sump pump 36. However, the overflow may be needed in a quiescent operation to prevent the tank 50 from completely filling with water due to seepage or other means.

What is claimed as new is:

1. A separator comprising:
   a sealed generally cylindrical holding tank having an upper portion extending along a generally central vertical axis and having an initial charge of fluid therein and a lower portion integral with said upper portion and extending downwardly therefrom, and a generally conically-shaped section terminating in a waste collection orifice integral with said lower portion and extending downwardly therefrom;
   means operatively engaging said tank in fluid communication with the interior of said tank at approximately the intersection of said lower portion with said conically-shaped section for introducing a fluid therein under a pressure sufficient to impart a fluid vortex to the initial charge of fluid within said tank about said central axis sufficient to create a difference in the level of fluid within said tank between the center thereof and the periphery thereof in a manner raising fluid into the upper portion of said tank;
   a generally cylindrically housed filtering assembly located within said tank and extending from said upper portion to said lower portion, said filtering assembly having filtered fluid removal means extending through said filtering assembly from substantially said lower portion to said upper portion and out of said tank and generally coaxially aligned with the central vertical axis of said tank and in fluid communication with fluid in said tank for removing filtered fluid therefrom;
   a generally cylindrical inner filter having a plurality of filtering passages extending therethrough surrounding said filtered fluid removal means;
   a generally cylindrical outer filter having a plurality of filtering passages extending therethrough surrounding said inner filter and spaced from the internal wall of said filtering assembly, said inner filter having substantially finer filtering passages than said passages in said outer filter;

aperture means associated with said filtering assembly in fluid communication with both said means in fluid communication with the interior of said tank and the space between said outer filter and the inner wall of said filtering assembly; and a generally cylindrical filter of hydrophobic material associated with said filtering assembly surrounding said filtered fluid removal means disposed above said inner and outer filters.

2. The separator of claim 1 wherein said means in fluid communication with the interior of said tank includes a manifold surrounding said tank and having a plurality of inlet ports in fluid communication with the interior of said tank, said ports being generally tangential with respect to said tank.

3. The separator of claim 1 wherein said filtered fluid removal means includes an output pipe having a plurality of spaced apertures along the periphery thereof.

4. The separator of claim 1 wherein the passages in said inner filter have a particle size greater than approximately ½ micron and the passages in said outer filter have a particle size greater than approximately 5 microns.

* * * * *